United States Patent [19]

Walker et al.

[11] 4,154,804

[45] May 15, 1979

[54] NOVEL CALCIUM CHLORIDE SCRUBBING BATH

[75] Inventors: John D. Walker; Darrell B. Reed, both of Baton Rouge, La.

[73] Assignee: Allied Chemical Corporation, Morris Township, Morris County, N.J.

[21] Appl. No.: 863,507

[22] Filed: Dec. 22, 1977

[51] Int. Cl.$^2$ ............................................. B01D 53/34
[52] U.S. Cl. ................................. 423/240; 423/481; 423/483; 423/488; 423/490
[58] Field of Search ............... 423/240, 241, 481, 483, 423/488, 490

[56]  References Cited

U.S. PATENT DOCUMENTS

| | | | |
|---|---|---|---|
| 2,345,696 | 3/1944 | Benning et al. | 423/488 |
| 2,507,603 | 5/1950 | Killgore | 423/483 |
| 2,526,777 | 10/1950 | Smith et al. | 423/483 |
| 2,690,815 | 10/1954 | Calfee et al. | 423/483 |
| 2,920,941 | 1/1960 | Sanlaville et al. | 423/483 |
| 3,140,916 | 7/1964 | Lowdermilk | 423/488 |
| 3,743,704 | 7/1973 | West | 423/490 |

FOREIGN PATENT DOCUMENTS

| | | | |
|---|---|---|---|
| 556722 | 4/1958 | Canada | 423/240 |
| 835853 | 3/1970 | Canada | 423/488 |

*Primary Examiner*—Earl C. Thomas
*Attorney, Agent, or Firm*—Jay P. Friedenson

[57] ABSTRACT

In accordance with the process of the present invention, substantially complete removal of hydrogen fluoride values from a hydrogen chloride gas stream containing the same is effected by a process wherein the gas stream is contacted with an aqueous medium containing calcium chloride and hydrogen chloride under conditions sufficient to precipitate calcium fluoride, thereby producing a hydrogen chloride acid gas substantially free of hydrogen fluoride. The aqueous solution containing the calcium fluoride solids may be treated as by filtration to remove the solids and the recovered liquor may be recycled to the absorption stage, with optional addition of make-up calcium chloride, for removal of additional hydrogen fluoride.

8 Claims, No Drawings

NOVEL CALCIUM CHLORIDE SCRUBBING BATH

BACKGROUND OF THE INVENTION

Field of the Invention

This invention relates to separation of HCl from mixtures of the same with fluorine compound contaminants soluble in hydrochloric acid.

In industrial processes, such as the manufacture of chloro-fluorocarbons by fluorination of $CCl_4$ with HF, reaction gases and vapors are produced which contain relatively large quantities of by-product HCl together with small amounts of flourine compounds, usually in the form of HF and its soluble salts such as $SiF_4$. Economic considerations make HCl recovery very important. While recovery of the HCl itself raises no particular problems, fluorine contaminants are soluble in HCl and in aqueous solutions thereof, and although the fluorine contaminant content of recovered HCl is relatively low, there is no worthwhile commercial outlet for HCl or hydrochloric acid solutions containing fluorine compounds in amounts normally present in HCl recovered by conventional methods. For example, even in concentrations of 50 ppm and less, hydrofluoric acid can attack glass and enamel. Hence, reduction of the fluorine compound content to acceptably low values presents problems of substantial operating and economic importance. However, due to similarities in properties, it is very difficult to separate HF from HCl by usual procedures.

In patent and other technical literature, various processes have been disclosed which are directed, and with varying degrees of success, to the removal of the contaminant hydrogen fluoride from the by-product HCl in order to render the HCl commercially useful.

Processes which have been developed to remove HF from gases include those in which the gas is contacted with an aqueous solution of alumina (e.g., U.S. Pat. No. 2,920,941, issued in 1960 to J. Sanlaville et al.) and those in which the HF gas is passed over successive solid reaction masses, e.g. silica base and boric acid (U.S. Pat. No. 2,526,777, issued in 1949 to L. B. Smith et al. and solid, substantially anhydrous calcium chloride (German Patent Publication No. 2,229,571, issued in 1972 to D. R. Merchant). However, these processes do not provide sufficiently complete removal of HF, and use of solids to react with HF gives rise to materials handling problems and results in a large waste of solids, due to the formation on the particles of a scale of reaction product (e.g., $CaF_2$ in the instance of reaction with solid calcium chloride), which prevents reaction of core solid reactant with additional HF. Thus, reaction vessels containing these solids must be regularly serviced to remove inactivated particles and to introduce fresh solids. Equipment utilization during down time is lost to the process, and the repeated venting of the equipment gives rise to environmental pollution problems due to escape to the atmosphere of gases in the reactor.

In the process of U.S. Pat. No. 2,690,815 (issued in 1954 to J. D. Calfee et al.), an aqueous HF solution is employed to preferentially absorb HF from HCl/HF gas mixtures, and in the methods of U.S. Pat. No. 2,345,696 (issued in 1944 to A. F. Benning et al.) and Canadian Pat. No. 835,853 (issued in 1970 to P. Frisch et al.), an HCl/HF gas mixture is contacted with a concentrated HCl solution to absorb HF. However, the HCl gas thereby produced, when recovered by adiabatic absorption in water, provides an aqueous hydrochloric acid which is unsuitable for many purposes, since the exit HCl gas still contains small amounts of HF. Moreover, such processes require the handling of large volumes of highly corrosive mixtures of hydrofluoric and hydrochloric acids.

To obtain more complete HF removal while still retaining the process advantages of a liquid absorption process, the prior art has developed processes in which dissolved HF is caused to react with an added reactant to precipitate $CaF_2$. Thus, U.S. Pat. No. 3,743,704 (issued in 1973 to N. E. West) relate to a process in which HF gas is absorbed in water and $Ca(OH)_2$, $CaCO_3$ or a mixture thereof added to the aqueous HF solution to precipitate $CaF_2$. In Dutch Patent Publication No. 7,003,378 (laid open to public inspection on Sept. 15, 1970) HF gas is absorbed using an aqueous $Ca(OH)_2$ solution to precipitate $CaF_2$ directly. However, these processes require the addition to the settling zone of a second substance, e.g. soluble alkaline earth salts such as $CaCl_2$ and $MgCl_2$, to allow effective settling of the fine $CaF_2$ particles, which would otherwise form a slow-settling gelatenous precipitate. In addition, these processes require careful pH control to provide a $CaF_2$ precipitate which may be easily removed.

In the process of U.S. Pat. No. 2,507,603 (issued in 1950 to A. J. Killgore), escaping gaseous HF catalyst is neutralized by absorption with an aqueous $CaCl_2$ solution to form a solution containing $CaF_2$ solids, which is then contacted with a carbonate, such as $CaCO_3$, to regenerate the $CaCl_2$ solution for recycle to the HF absorption step. However, such a process is not readily adaptable to separation of HF from HCl/HF gas mixtures in which recovery of HCl is also desired, and the product results in HCl with unacceptably high residual content of HF. Thus, this patent describes an exemplary process (at column 4, line 51 to column 5, line 32) in which the "substantially hydrogen-free" HCl which was recovered contained 0.02 to 0.3% HF.

U.S. Pat. No. 3,140,916 (issued in 1964 to Lowdermilk) disclosed a process wherein product gases from the production of chloro-fluorohydrocarbons are initially scrubbed with a dilute solution of hydrochloric acid to absorb substantially all of the HF and HCl from the product gases. The solution containing HF and HCl is then continuously fed to a heated stripping tower which produces anhydrous hydrogen chloride as overhead and a bottoms product containing HCl and HF. After the bottoms product builds up to in excess of 1% HF, it is cooled and treated with an aqueous $CaCl_2$ solution to form $CaF_2$ crystals which are removed from the parent liquor by filtration. While the foregoing process successfully removes a portion of the hydrogen fluoride from the by-product HCl/HF gas stream, the process has a serious deficiency in that the HCl gas produced still contains substantial quantities of HF. Moreover, the reference requires use of $CaCl_2$ in less than stoichiometric amounts to ensure at least about 1 wt.% HF remains in the bottoms, thereby increasing the HF vapor pressure of recycle to the stripper and, consequently, the HF in the HCl overhead. More complete conversion of HF to calcium fluoride and, hence, lower residual HF concentrations, are not obtained since greater amounts of a gelatinous deposit of calcium chloride were formed thereby leading to severe processing difficulties.

In the process of Canadian Pat. No. 556,772 (issued in 1958 to L. Foulletier et al.) an HCl/HF gas is contacted with a saturated aqueous HCl solution containing dissolved metallic salt such as calcium or aluminum chloride. The HF which is absorbed reacts to form a metallic fluoride precipitate. However, this process does not cure the problems associated with removal of the $CaF_2$ precipitate (which is formed using $CaCl_2$) and is also disadvantaged by the residual HF content of the HCl gas exiting the process (e.g., 0.03 molecule % HF using aluminum chloride in Example 3 at column 4, line 72) which is still too high for many uses of HCl.

Accordingly, there is a need for a process which would provide efficient removal of greater quantities of hydrogen fluoride from by-product hydrogen chloride gaseous streams.

SUMMARY OF THE INVENTION

In accordance with the process of the present invention, a hydrogen chloride gas stream containing hydrogen fluoride is treated for substantially complete removal of hydrogen fluoride therefrom by a process wherein the gas stream is contacted in a contacting zone with an aqueous medium containing calcium chloride and hydrogen chloride to form calcium fluoride solids, and withdrawing from said contacting zone a hydrogen chloride gas substantially free of hydrogen fluoride. The aqueous solution containing the calcium fluoride solids may be treated as by filtration to remove the solids and the recovered liquor may be recycled to the absorption stage, with optional addition of make-up calcium chloride, for removal of additional hydrogen fluoride.

The present invention has been unexpectedly found to enable recovery of an HCl gas containing much lower HF concentrations than have heretofore been obtained by prior art processes while avoiding the problems associated with the formation of a gelatinous $CaF_2$ precipitate which the prior art experienced, without the need to employ additional coagulants or flocculants. Thus, the present invention permits efficient and rapid removal of $CaF_2$ solids for recycle of separated liquor to the absorption step. Finally, the present invention does not require the handling of large volumes of highly corrosive liquid mixtures of hydrochloric acid and hydrofluoric acid.

DETAILED DESCRIPTION OF THE INVENTION

The gases treated herein for removal of hydrogen fluoride are gases containing hydrogen chloride together with hydrogen fluoride and are herein termed "HCl/HF gases".

The HCl/HF gas to be treated in accordance with the process of the present invention may be obtained, for example, as by-product in the manufacture by fluorination of fluorohydrocarbons, such as trichloromonofluoromethane, dichlorodifluoromethane, dichloromonofluoromethane, monochlorodifluoromethane, trichlorotrifluoroethane and dichlorotetrafluoroethane. The HCl/HF gas will therefore contain hydrogen fluoride, hydrogen chloride and organic impurities in a wide variety of concentrations, depending upon the particular process from which the gas is obtained. Generally, however, HCl/HF gas treated in accordance with the process of the present invention will contain from about 25 to 62 weight percent, and preferably from about 45 to 65 weight percent, hydrogen chloride; from about 0.3 to 3 weight percent, and preferably from about 1 to 2 weight percent, hydrogen fluoride; and from about 35 to 75 weight percent, and preferably from about 65 to 73 weight percent, organic impurities. The organic impurities which may be present in the gas may also vary widely, and impurities such as carbon tetrachloride, monochlorotrifluoromethane, chloroform, trifluoromethane, tetrachlorodifluoroethane and monochloropentafluoroethane are typical. These organic impurities, and preferably the majority of the hydrogen chloride gas, pass through the contacting zone substantially unreacted.

Upon contact with the aqueous medium, hydrogen fluoride is absorbed from the HCl/HF gas and reacts with calcium chloride contained in the aqueous medium to form calcium fluoride precipitate which may then be removed by standard techniques, such as by filtration, centrifuging or allowing the solids to settle and decanting the liquor. The separated aqueous liquid may be recycled to the process, with addition of make-up calcium chloride, for absorption and reaction of additional hydrogen fluoride. Make-up calcium chloride and water may be added directly to the recycled absorbing solution or, as is more preferred, a portion of depleted calcium chloride solution may be withdrawn to a mixing tank and the make-up solid calcium chloride added therein, with the reconstituted aqueous medium then being recycled to the contacting vessel for absorption of additional hydrogen fluoride values.

The aqueous medium may contain calcium chloride in a wide variety of concentrations, depending on the concentration of hydrogen fluoride in the HCl/HF gas to be treated, the degree of removal sought for the hydrogen fluoride, the temperature of the aqueous medium and other factors. However, the aqueous medium will generally contain calcium chloride dissolved therein in an amount of from about 5 to 40 weight percent of the solution, and preferably from about 16 to 20 weight percent of the solution. Preferably, however, the aqueous absorbing solution contains dissolved $CaCl_2$ in an amount at least equivalent to that amount stoichiometrically required to react with the quantity of gaseous HF into which the solution will be brought into contact, and most preferably at least 5 wt.% $CaCl_2$ greater than this stoichiometric equivalent.

The aqueous medium may also contain a wide range of hydrochloric acid concentrations, and will generally contain from about 5 to 30 weight percent, and preferably from about 20 to 25 weight percent, hydrochloric acid. As additional hydrochloric acid is formed by reaction of absorbed HF and calcium chloride, an equilibrium amount will be absorbed depending upon the temperature and calcium chloride concentration.

It has been found that absorption of HF in an aqueous solution containing hydrochloric acid and calcium chloride and the consequent reaction $CaF_2$ results in a mixture from which $CaCl_2$ precipitates at a rate increasing with increased HCl concentrations. Thus, it is of great importance that the temperature of the liquid absorption medium be carefully controlled to the $HCl/CaCl_2$ equilibrium in the liquid phase and prevent $CaCl_2$ precipitation. The appropriate temperature meeting this criterion may be readily determined by one of ordinary skill in the art. Generally, however, it has been found in operation of the process of the present invention that the necessary temperature at which the aqueous calcium chloride solution be maintained lies in the range of about 86° to 158° F., and more preferably of about 104° to 140° F., in order to control the hydrogen chloride solubility so as to prevent insolubilization of substantial amounts of calcium chloride from the aqueous medium. The precise temperature required will, of course, depend on the concentrations of hydrochloric acid and calcium chloride in the absorbing solution, and other factors. For an example, a temperature of about 137° F. is preferred for an aqueous absorbing solution containing about 23 wt.% HCl and about 17 wt.% $CaCl_2$ to avoid $CaCl_2$ precipitation.

The pressure at which the process operates is not critical and may vary widely, atmospheric pressure having been found to be quite satisfactory.

The HCl/HF gas may be contacted with the aqueous calcium chloride medium by any standard technique employed to contact a gas and liquid. Thus, for example, the gas may be sparged through an aqueous calcium chloride solution, or the gas may be contacted with the aqueous solution by passing the gas in a countercurrent or co-current fashion through an absorption tower containing the solution. Preferably, however, a fine mist of the aqueous calcium chloride solution is formed, as by use of a conventional aspirator or ejector, and the mist then brought (most preferably in a co-current fashion) into contact with the HCl/HF gas to be treated. In the latter embodiment, the mist into which the HF is absorbed may be allowed to coalesce and collect in a bottom portion of the contacting zone for withdrawal of aqueous liquor containing the calcium fluoride solids which form for separation of these solids. Thus, the present invention may contact the absorbing medium and HF/HCl gas in such apparatus as ejectors, packed towers, falling film absorbers, tray or plate towers and porous tube reactors. These apparatus may be constructed of acid resistant materials known to the art.

The process of the present invention may be performed in a batchwise, continuous or semi-continuous manner, although a continuous process is preferred.

It has been found that the process of the present invention is effective in removing up to 99 weight percent of the hydrogen fluoride initially present in the HCl/HF gas, thus providing a hydrogen chloride gas stream which contains less than 9.3 ppm and more preferably less than 3.6 ppm hydrogen fluoride, and which may therefore be said to be substantially free of hydrogen fluoride.

The exiting hydrogen chloride gas may be passed to subsequent processing wherein a hydrogen chloride gas substantially free of hydrogen fluoride values is desired. If desired, the gas which has been treated by the process of the present invention, may be subsequently treated by use of known techniques to remove the organic impurities.

The process of the present invention may be further illustrated by reference to the following examples.

In the following examples, gas flow rates are measured by using an integral orifice dP cell transmitter. Gas compositions are determined by bubbling gas at a known gas rate through a predetermined quantity of water until the water reaches a temperature of about 90° F. The solution is weighed and analyzed for total acidity. A sample of the solution is analyzed for fluoride and the HF and HCl content calculated. The gas composition is derived by the steps of (1) multiplying the HF or HCl weight fraction in the solution by the total solution weight, (2) converting the weight to lb. moles and (3) dividing the lb. moles figure by total gas volume (gas rate × time) passed through the water.

EXAMPLE 1

In the following runs, a feed gas containing 27 weight percent HCl, 0.03 weight percent HF and 72.7 weight percent organics (mainly trichloromonofluoroethane and dichlorodifluoromethane) is scrubbed in a packed tower (packed to a height of 14 inches with a bottom 4 inch layer of ½ inch carbon raschig rings and 10 inch top layer of 3/16 inch carbon raschig rings, and made from 1.5 inch schedule 40 PVC pipe) with an aqueous solution containing selected amounts of $CaCl_2$ and HCl. Runs 1 and 2 employ countercurrent and/liquid contact, whereas Runs 3–14 employ co-current gas/liquid flow. Liquid withdrawn from the tower is recycled to the tower for further HF absorption. Operating data, including the composition of feed solution, feed gas and exit gas, the process flow rates and solution temperature are set forth in Table I below. Runs 1–5 employ a common recycled absorbing solution containing $CaCl_2$ and HCl, with make-up $CaCl_2$ added to obtain the indication concentration. Runs 6–14 also employ a common recycled absorbing solution.

TABLE I

| Run No. | AQUEOUS SOLUTION | | | | Gas Flow Rate (SCFM) | Feed Gas Temp. (° F.) | Feed Gas, moles/ft$^3$ | | Exit Gas, moles/ft$^3$ | |
| | Flow Rate (GPM) | Temp. (° F.) | Composition (wt. %) | | | | | | | |
| | | | $CaCl_2$ | HF | HCl | | | HF | HCl | HF | HCl |
|---|---|---|---|---|---|---|---|---|---|---|---|
| 1 | 0.132 | 76 | 33.6 | <.0001 | 4.5 | 0.29 | 59 | $3.0\times10^{-5}$ | $1.2\times10^{-3}$ | $<3.0\times10^{-6}$ | $9.2\times10^{-4}$ |
| 2 | 0.132 | 77 | 34.0 | " | 6.0 | " | 56 | $2.6\times10^{-5}$ | $1.2\times10^{-3}$ | $1.8\times10^{-6}$ | $2.6\times10^{-5}$ |
| 3 | 0.845 | 78 | 37.4 | " | 8.7 | " | 60 | $2.1\times10^{-5}$ | $1.4\times10^{-3}$ | $1.9\times10^{-6}$ | $1.0\times10^{-5}$ |
| 4 | 0.845 | 88 | 22.6 | " | 11.5 | " | 65 | $2.1\times10^{-5}$ | $1.2\times10^{-3}$ | $1.7\times10^{-6}$ | $3.7\times10^{-5}$ |
| 5 | 0.845 | 89 | 33.7 | " | 13.0 | " | 65 | $2.2\times10^{-5}$ | $1.3\times10^{-3}$ | $2.1\times10^{-6}$ | $6.5\times10^{-5}$ |
| 6 | 0.740 | 90 | 40.4 | " | 3.4 | 0.50 | 71 | $2.0\times10^{-5}$ | $1.4\times10^{-3}$ | $<3.7\times10^{-8}$ | $1.2\times10^{-5}$ |
| 7 | 0.740 | 101 | 36.4 | " | 7.7 | " | 68 | $2.4\times10^{-5}$ | $1.6\times10^{-3}$ | $<3.7\times10^{-8}$ | $2.6\times10^{-5}$ |
| 8 | 0.740 | 101 | 35.7 | " | 9.4 | " | 63 | $2.2\times10^{-5}$ | $1.5\times10^{-3}$ | $<3.7\times10^{-8}$ | $3.6\times10^{-5}$ |
| 9 | 0.687 | 91 | 34.4 | " | 12.8 | 0.72 | 64 | $1.9\times10^{-5}$ | $1.3\times10^{-3}$ | $2.6\times10^{-8}$ | $6.7\times10^{-5}$ |
| 10 | 0.687 | 101 | 31.6 | " | 16.6 | " | 70 | $1.4\times10^{-5}$ | $1.2\times10^{-3}$ | $<2.6\times10^{-8}$ | $3.5\times10^{-4}$ |
| 11 | 0.687 | 96 | 36.8 | " | 17.9 | " | 68 | $1.4\times10^{-5}$ | $1.2\times10^{-3}$ | $2.6\times10^{-8}$ | $3.1\times10^{-4}$ |
| 12 | 0.634 | 86 | 33.1 | " | 19.3 | " | 90 | $3.9\times10^{-5}$ | $1.0\times10^{-3}$ | $<3.8\times10^{-8}$ | $2.7\times10^{-4}$ |
| 13 | 0.634 | 94 | 28.6 | " | 20.4 | " | 75 | $7.1\times10^{-6}$ | $8.4\times10^{-4}$ | $<3.9\times10^{-8}$ | $5.1\times10^{-4}$ |
| 14* | 0.201 | 95 | 32.8 | " | 20.4 | " | 60 | $1.4\times10^{-5}$ | $1.2\times10^{-3}$ | $<7.7\times10^{-8}$ | $4.4\times10^{-4}$ |

*Tower became plugged with precipitated $CaCl_2$

EXAMPLE 2

In the following runs, a feed gas containing 2.2 weight percent HF, 47 weight percent HCl and 50.8 weight percent organics (mainly monochlorodifluoromethane, trifluoromethane and dichloromonofluoromethane) is passed in cocurrent contact with an aqueous absorbing solution of the desired CaCl and HF concentration, using the packed tower of Example 1. Runs 1 and 2 are made without controlling the temperature of the absorbing solution passed to the tower. To prevent equipment fouling by $CaCl_2$ precipitation, Runs 3-7 employ a constant temperature water bath to control the feed solution's temperature. Data obtained from Runs 1-7 are set forth below in Table II.

TABLE II

| Run No. | AQUEOUS SOLUTION Flow Rate (GPM) | Temp. (°F.) | Composition (wt. %) $CaCl_2$ | HF | HCl | Gas Flow Rate (SCFM) | Feed Gas Temp. (°F.) | Feed Gas, moles/ft$^3$ HF | HCl | Exit Gas, moles/ft$^3$ HF | HCl |
|---|---|---|---|---|---|---|---|---|---|---|---|
| 1 | 0.185 | 92 | 19.2 | <.0001 | 28.6 | 0.55 | 76 | $9.8\times10^{-6}$ | $7.8\times10^{-4}$ | $<3.4\times10^{-8}$ | $2.2\times10^{-4}$ |
| 2* | 0.185 | 92 | 18.4 | " | 30.1 | " | 76 | $1.6\times10^{-5}$ | $6.9\times10^{-4}$ | $<3.4\times10^{-8}$ | $4.4\times10^{-4}$ |
| 3 | 0.264 | 132 | 19.0 | " | 24.8 | " | 76 | $1.8\times10^{-5}$ | $6.9\times10^{-4}$ | $<3.4\times10^{-8}$ | $1.4\times10^{-5}$ |
| 4 | 0.264 | 136 | 19.6 | " | 23.7 | " | 78 | $2.1\times10^{-5}$ | $6.2\times10^{-4}$ | $<3.4\times10^{-8}$ | $9.8\times10^{-4}$ |
| 5 | 0.264 | 140 | 15.8 | " | 22.5 | " | 85 | $1.6\times10^{-5}$ | $9.6\times10^{-4}$ | $<5.6\times10^{-8}$ | $5.6\times10^{-4}$ |
| 6 | 0.396 | 140 | 14.3 | " | 22.3 | " | 75 | $2.2\times10^{-5}$ | $8.1\times10^{-4}$ | $<5.1\times10^{-8}$ | $3.7\times10^{-4}$ |
| 7** | 0.264 | 136 | 16.4 | " | 23.4 | " | 80 | $1.8\times10^{-5}$ | $3.0\times10^{-4}$ | $<5.1\times10^{-8}$ | $4.8\times10^{-4}$ |

*Tower plugged with $CaCl_2$.
**Tower lugged with $CaF_2$.

EXAMPLE 3

Feed gas, having the HF, HCl and organic content as shown in Example 2, is passed through a Nalge Cat. No. 614 aspirator employing an aqueous $CaCl_2$/HCl solution as the driving medium. The temperature of the absorbing solution recycled to the aspirator is controlled by means of a constant temperature water bath to prevent pluggage by $CaCl_2$ solids. Data obtained are set forth in Table III below. No equipment pluggage with either $CaCl_2$ or $CaF_2$ is observed.

TABLE III

| Run No. | AQUEOUS SOLUTION Flow Rate (GPM) | Temp. (°F.) | Composition (wt. %) $CaCl_2$ | HF | HCl | Gas Flow Rate (SCFM) | Feed Gas Temp. (°F.) | Feed Gas, moles/ft$^3$ HF | HCl | Exit Gas, moles/ft$^3$ HF | HCl |
|---|---|---|---|---|---|---|---|---|---|---|---|
| 1 | 0.153 | 100 | 15.4 | <.0001 | 23.9 | 0.34 | 80 | $3.3\times10^{-5}$ | $7.5\times10^{-4}$ | $<2.6\times10^{-8}$ | $7.4\times10^{-5}$ |
| 2 | 0.068 | 100 | 24.9 | " | 25.1 | 0.55 | 80 | $2.1\times10^{-5}$ | $8.0\times10^{-4}$ | $<1.8\times10^{-8}$ | $1.8\times10^{-4}$ |
| 3 | 0.077 | 90 | 18.2 | " | 26.7 | 0.78 | 80 | $3.4\times10^{-5}$ | $7.2\times10^{-4}$ | $<1.3\times10^{-8}$ | $3.2\times10^{-4}$ |
| 4 | 0.128 | 90 | 19.2 | " | 24.6 | 0.39 | 80 | $4.6\times10^{-5}$ | $7.8\times10^{-4}$ | $<2.5\times10^{-8}$ | $1.1\times10^{-4}$ |
| 5 | 0.101 | 90 | 15.7 | " | 25.1 | 0.55 | 80 | $4.6\times10^{-5}$ | $7.1\times10^{-4}$ | $<1.8\times10^{-8}$ | $2.8\times10^{-4}$ |

Since various changes and modifications may be made in the invention without departing from the spirit thereof, it is intended that all matter contained in the above description shall be interpreted as illustrative and not in a limiting sense.

We claim:

1. In a process for removing hydrogen fluoride values from a hydrogen chloride gas stream containing the same comprising contacting the gas stream with an aqueous medium containing calcium chloride and hydrogen chloride under conditions sufficient to precipitate calcium fluoride; the improvement which consists essentially of controlling the temperature of the aqueous medium to the hydrogen chloride-calcium chloride equilibrium in the liquid phase to prevent calcium chloride precipitation.

2. The process according to claim 1 wherein a portion of said aqueous medium containing precipitated calcium fluoride is treated for removal of precipitated calcium fluoride, and the separated aqueous medium is recycled to the process for removal of additional hydrogen fluoride values.

3. The process according to claim 1 wherein said hydrogen chloride gas containing hydrogen fluoride contains from about 25 to 62 weight percent hydrogen fluoride.

4. The process according to claim 1 wherein said aqueous medium contains calcium chloride dissolved therein in an amount from about 5 to 40 percent by weight and hydrogen chloride dissolved therein in an amount from about 5 to 30 percent by weight.

5. The process according to claim 1 wherein said aqueous medium contains dissolved therein an amount of calcium chloride at least equivalent to that amount of calcium chloride required to react with the quantity of hydrogen fluoride present in the hydrogen chloride gas stream so contacted.

6. The process according to claim 1 wherein said aqueous medium is passed to the absorption zone at a temperature of from about 30° to 70° C.

7. The process according to claim 1 wherein the hydrogen chloride gas so produced contains less than about 9.3 weight percent hydrogen fluoride.

8. The process according to claim 1 wherein said hydrogen chloride gas passed to the process contains from about 45 to 55 weight percent hydrogen chloride, and from about 1 to 2 hydrogen fluoride, and wherein said aqueous medium contains from about 16 to 20 weight percent calcium chloride and from about 20 to 25 weight percent hydrogen chloride, and wherein said aqueous medium is passed to the absorption zone at a temperature of from about 40° to 60° C.

* * * * *

UNITED STATES PATENT AND TRADEMARK OFFICE
CERTIFICATE OF CORRECTION

PATENT NO. : 4,154,804
DATED : May 15, 1979
INVENTOR(S) : John D. Walker and Darrell B. Reed It is certified that error appears in the above-identified patent and that said Letters Patent are hereby corrected as shown below:

Col. 1, line 14: "flourine" should be -- fluorine --.

Col. 2, line 67: "556,772" should be -- 556,722 --.

Col. 7, line 19: "lugged" should be --plugged--.

Col. 8, line 21: delete "fluoride" and insert -- chloride and from about .3 to 3 weight percent hydrogen fluoride --.

Signed and Sealed this

Twenty-second Day of April 1980

[SEAL]

Attest:

SIDNEY A. DIAMOND

Attesting Officer

Commissioner of Patents and Trademarks